US005717772A

United States Patent [19]

Lane et al.

[11] Patent Number: 5,717,772

[45] Date of Patent: Feb. 10, 1998

[54] METHOD AND APPARATUS FOR SUPPRESSING ACOUSTIC FEEDBACK IN AN AUDIO SYSTEM

[75] Inventors: John E. Lane, Satellite Beach, Fla.; Dan Hoory; Johnny Choe, both of Austin, Tex.

[73] Assignee: Motorola, Inc., Schaumburg, Ill.

[21] Appl. No.: 511,673

[22] Filed: Aug. 7, 1995

[51] Int. Cl.[6] .......... H04B 15/00

[52] U.S. Cl. .......... 381/93; 381/83; 381/96

[58] Field of Search .......... 381/93, 83, 68, 381/68.1, 68.4, 94, 95, 96, 98, 94.1; 379/406, 412

[56] References Cited

U.S. PATENT DOCUMENTS

| | | | |
|---|---|---|---|
| 4,079,199 | 3/1978 | Patronis, Jr. | 381/83 |
| 4,091,236 | 5/1978 | Chen | 381/93 |
| 4,965,833 | 10/1990 | McGregor et al. | 381/93 |
| 5,245,665 | 9/1993 | Lewis et al. . | |
| 5,442,712 | 8/1995 | Kawamura et al. | 381/93 |

OTHER PUBLICATIONS

Lane, John, et al; "An Adaptive IIR Phase Measurement Structure for Estimation of Multiple Sinusoids"; Proc. of ICASSP'90, Albuquerque, NM, Apr. 3-6, 1990.

*Primary Examiner*—Curtis Kuntz
*Assistant Examiner*—Ping W. Lee

[57] ABSTRACT

Acoustic feedback is removed from an audio signal (50) by digitizing the audio signal (50) to produce a digitized audio signal (54). The digitized audio signal (54) is then filtered with an adaptive bandpass filter (56) to detect the frequency of the acoustic feedback, where the adaptive bandpass falter (56) is aligned with the feedback based on a phase relationship between the input and the output of the adaptive bandpass filter (56). A notch filter (58) is then configured based on the frequency of the acoustic feedback, and the digitized audio signal (54) is filtered with the notch filter (58) to attenuate the feedback. The feedback-attenuated digitized signal (62) is converted to a feedback-attenuated analog signal (70).

12 Claims, 6 Drawing Sheets

METHOD AND APPARATUS FOR SUPPRESSING ACOUSTIC FEEDBACK IN AN AUDIO SYSTEM

FIELD OF THE INVENTION

This invention relates generally to the filtering of audio signals, and more particularly to a method and apparatus for suppressing acoustic feedback in an audio system.

BACKGROUND OF THE INVENTION

The amplification of electrical signals to produce amplified acoustic audio signals is well known in the art. Common applications where signals are amplified and provided to speakers to produce acoustic signals include telephone systems and public address systems.

In a public address system, an acoustic audio signal is received by a microphone, converted to an electrical signal, amplified by an amplifier, and provided to a speaker where it is reproduced as an amplified acoustic audio signal. In many situations, a portion of the amplified acoustic audio signal is received by the microphone. Because the electrical signals received by the microphone are, in effect, the same signals previously provided to the amplifier, a feedback loop is established, where the feedback loop includes both electrical and acoustic coupling. Oftentimes, the microphone in a public address system is located very near the speakers of the system. Depending upon the dynamics of the speakers, the microphone, the gain of the amplifier, and the acoustics of the room or space in which the system resides, positive feedback may result causing large audible acoustic signals at particular frequencies. As one skilled in the art will readily appreciate, the physical dimensions of the room, the relative positioning of the microphone and the speaker, the gain of the amplifier, and the density of the air will determine at which particular frequencies feedback occurs.

In older hands-free telephone systems, half-duplex, or one-way, communication was used to eliminate feedback. While one user was talking, reception from the other user was not allowed. Thus, no feedback loop could be established. Full-duplex telephone systems, however, are forced to contend with the feedback problem. In some cases, the relative positioning of the speaker and microphone is fixed to reduce feedback. In such systems, probable feedback frequencies can be determined, and in some cases the system can be designed to include filtering apparatus to attenuate any feedback that may occur at these probable feedback frequencies.

With the advent of full-duplex hands-free telephone sets where the speaker is in a fixed location and the microphone moves, the relative positioning between the microphone and the speaker changes as the microphone moves. Thus, the acoustic coupling between the microphone and the speaker also changes. For this reason, it is difficult to anticipate at which frequencies feedback may occur in the system, thus making preventative filtering impractical.

Acoustic feedback suppression systems in public address systems are known in the art. For example, the acoustic feedback suppression system disclosed in U.S. Pat. No. 4,079,189 uses an analog filtering technique for conditioning signals prior to their amplification and coupling to the speaker. The prior-art system employs a plurality of analog filters within the signal path to attenuate signal components that appear to contain feedback. The device selectively tunes the analog filters to increase or decrease the attenuation based upon the particular feedback behavior of the system. The analog circuitry required for this system, however, is both expensive and complex. Further, this analog system suffers the shortcoming of inaccuracy in determining the bandwidths and attenuation levels of the filters.

Other prior-art solutions digitize the audio information and process the resulting digital audio signal in order to remove unwanted feedback. These solutions perform a time-to-frequency conversion on the digital audio signal using algorithms such as the Fast-Fourier Transform in order to obtain the frequency spectrum of the signal. The frequency spectrum can then be examined for spikes or areas of high magnitude that represent feedback. The signal, in digital or analog form, can then be filtered to remove the feedback components. Because of the processing power required to implement algorithms such as the FFT, multiple processors may be necessary to convert to the frequency domain, detect the feedback, and filter the signal to remove the feedback. Single processors having a large amount of processing power may be able to support such a system, but the amount of processing power consumed when implementing the FFT leaves little power for other signal processing functions that may be desired.

Therefore, a need exists for a method and apparatus for efficient detection and removal of feedback components in audio systems, where the frequencies of feedback components may change over time.

DETAILED DESCRIPTION OF A PREFERRED EMBODIMENT

Generally, the present invention provides a method and apparatus for removing acoustic feedback from an audio signal. This is accomplished by receiving the audio signal containing the acoustic feedback and digitizing the audio signal to produce a digital audio signal. The digital audio signal is then filtered with an adaptive bandpass filter to detect the frequency of the acoustic feedback. A notch filter is then configured based on the frequency of the acoustic feedback, and the digital audio signal is then filtered with the notch filter to attenuate the feedback. The filtered digital audio signal is then converted to a filtered analog audio signal. With such a method and apparatus, acoustic feedback, which may change over time, can be removed in an efficient manner that requires less processing power than prior-art techniques.

Figure 1:
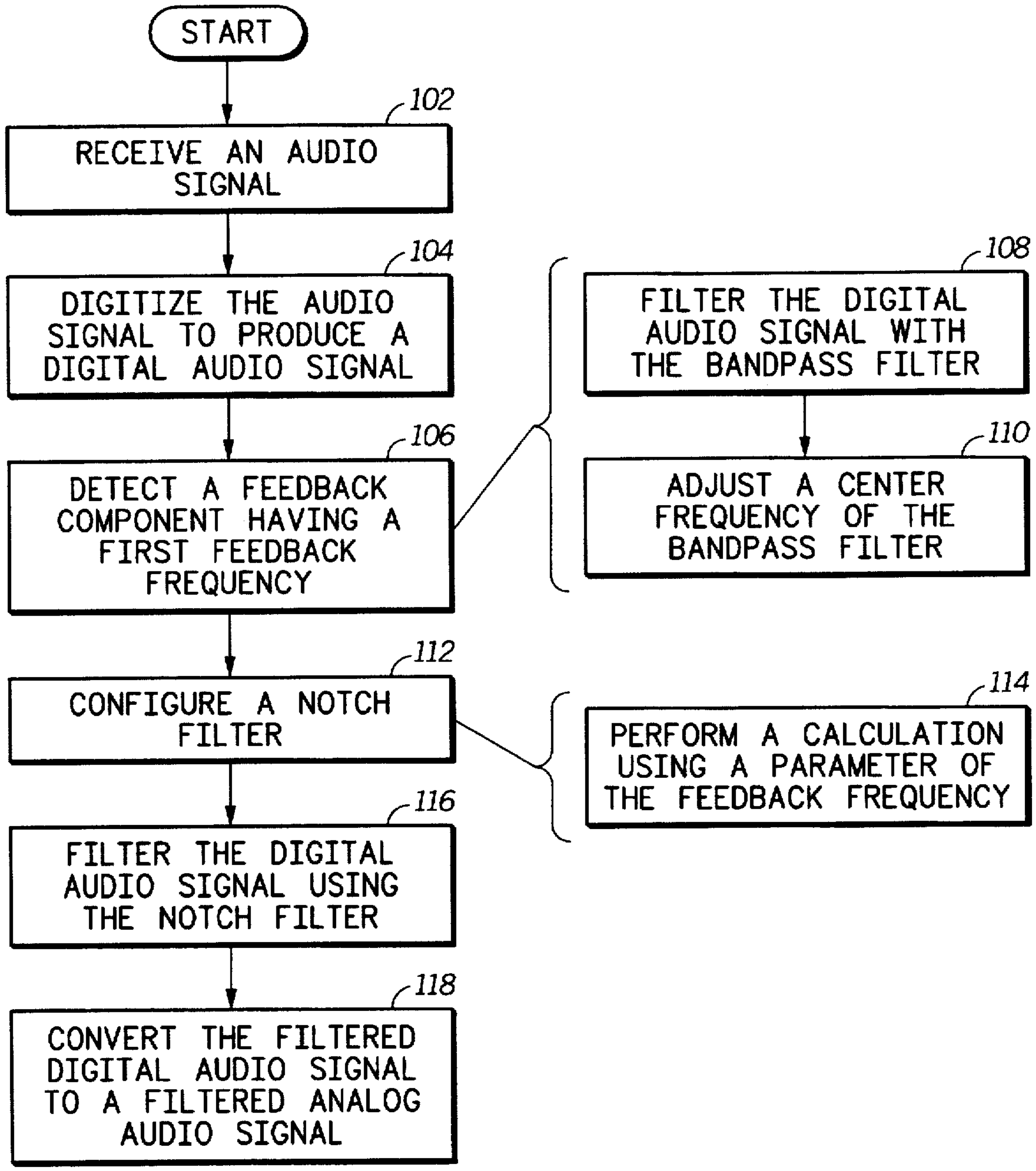
FIG. 1 illustrates a flow diagram of a method for removing acoustic feedback in an audio signal in accordance with the present invention.

FIG. 1 illustrates a method for removing acoustic feedback from an audio signal. In one preferred embodiment, the audio signal is received from a microphone, where the microphone may be part of a public address system, a hands-free telephone system, etc. After receiving the audio signal at step 102, the audio signal is digitized at step 104 to produce a digital audio signal. At step 106, a feedback component of the digital audio signal is detected using an adaptive bandpass filter.

The detection of the feedback component may be accomplished by steps 108 and 110. At step 108, the digital audio signal is filtered with the adaptive bandpass filter to produce a bandpass filtered signal. In the preferred embodiment, the adaptive bandpass filter is a second order infinite impulse response (I/R) filter. At step 110, the center frequency of the adaptive bandpass filter is adjusted based on a phase relationship between the bandpass filtered signal and the digital audio signal. The phase relationship causes the passband of the adaptive bandpass filter to move until the passband is centered on the acoustic feedback. In other words, the filter shifts in frequency until it is aligned with the feedback frequency. When the phase relationship reaches this point, the feedback component is detected.

At step 112, a notch filter is configured based on the feedback frequency. The configuration is based on the adaptive parameter of the adaptive bandpass filter used in steps 108 and 110. Thus, the notch filter follows, or tracks, the location of the adaptive bandpass filter in the frequency domain. The specific parameter used in the preferred embodiment is the cosine of the normalized center frequency of the adaptive bandpass filter. In the preferred embodiment, the notch filter is also an IIR filter. In step 114, a parameter that relates to the feedback frequency is used in a calculation for configuring the notch filter. This parameter may be one of the variables used in positioning the bandpass filter such that it is aligned with the feedback frequency. Thus, the positioning of the notch filter is dependent on the positioning of the bandpass filter.

At step 116, the digital audio signal is filtered using the notch filter such that the feedback component of the digital audio signal is attenuated to produce a filtered digital audio signal. In the preferred embodiment, the stop-band of the notch filter is smaller than the pass-band of the bandpass filter which will minimize the potential for attenuating non-feedback information in the digital audio signal. At step 118, the filtered digital audio signal is converted to a filtered analog audio signal. In a system such as a public address system, the filtered analog audio signal is then amplified and passed to a speaker.

The method illustrated in FIG. 1 is easily expanded upon to detect and filter additional feedback components. Once a first notch filter has been configured, it can continue to attenuate the signal at the location of the first feedback component while the bandpass filter is used to search for additional feedback components. The bandpass filter can align itself to detect a second feedback component, and a second notch filter can be configured based on the second feedback component.

It should be obvious to one skilled in the art that the bandpass filter can be used repeatedly for detection of different feedback components, and a bank of notch filters can be configured accordingly to attenuate detected feedback. In the case where the number of notch filters is limited, an allocation/de-allocation scheme can be implemented to optimize the attenuation of the feedback with the limited number of filters. This allocation/de-allocation scheme may include a first set of notch filters that are configured to a set of feedback frequencies that are inherent to the system, and thus likely to remain constant during use. In this case, the allocation/de-allocation scheme may also include a second set of notch filters that are designated for feedback components that change regularly based on different variables in the system. The second set of notch filters would be re-configured regularly, while the first set may be static once initially configured.

By using the method illustrated in FIG. 1, the feedback in an audio system is eliminated without the need for costly analog filters or the processing power required to perform time-to-frequency conversion of the digital audio signal. In the preferred embodiment where the method is executed by a single digital signal processor (DSP), the minimization of processing power allows for other signal processing functions to be implemented simultaneously on the DSP.

Figure 2:
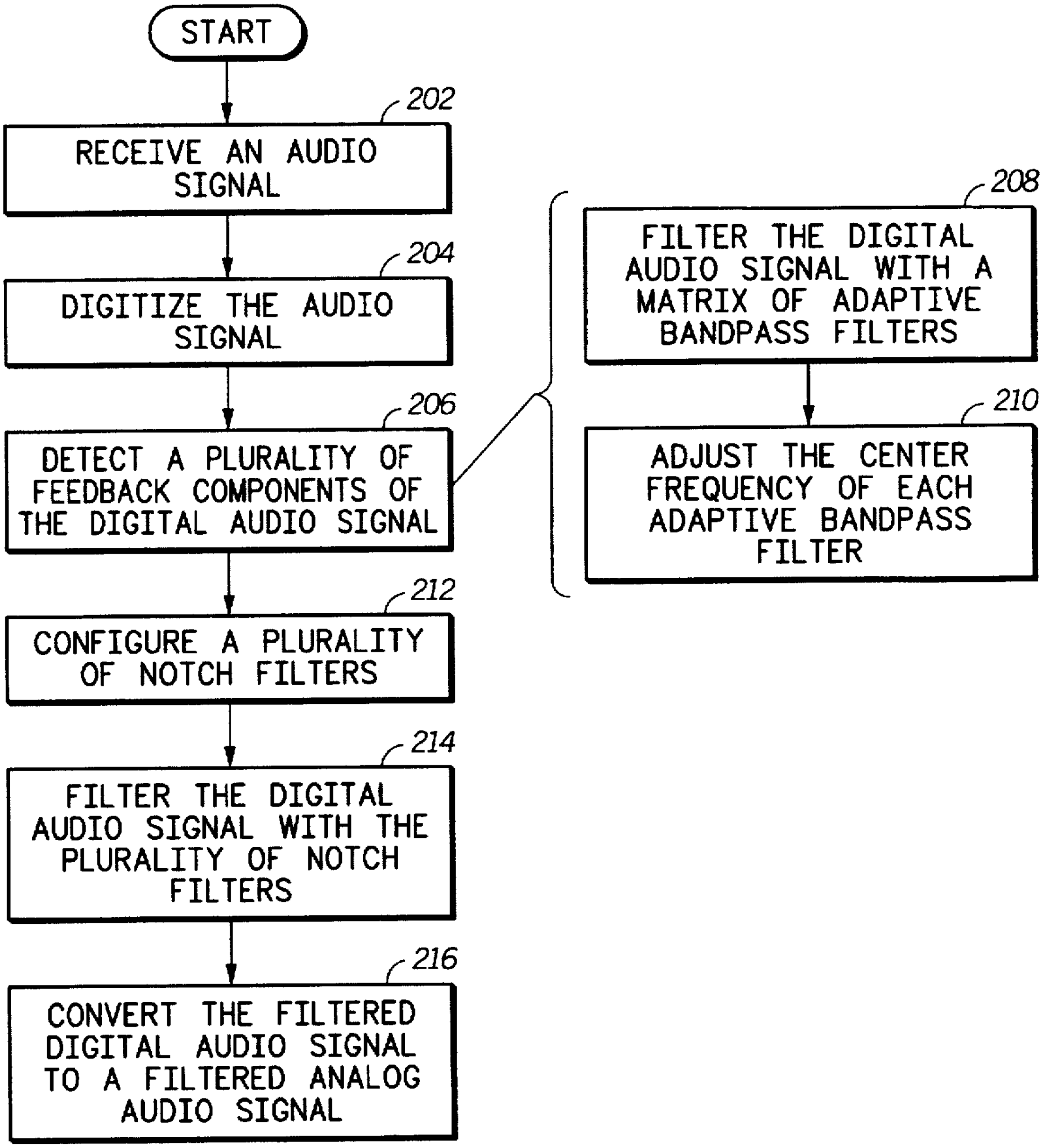
FIG. 2 illustrates a flow diagram of another method for removing acoustic feedback in an audio signal in accordance with the present invention.

FIG. 2 illustrates an alternate method for removing acoustic feedback from an audio signal, in accordance with the present invention. At steps 202 and 204, an audio signal is received and digitized in a manner similar to steps 102 and 104 of FIG. 1 to produce a digital audio signal.

At step 206, a plurality of feedback components of the digital audio signal are detected using a matrix of adaptive bandpass filters, where each of the feedback components occurs at a corresponding feedback frequency. In the preferred embodiment, the adaptive bandpass filters are IIR filters, and the step of detection is accomplished as described in steps 208 and 210. At step 208, the digital audio signal is filtered by the matrix of bandpass filters to produce a plurality of bandpass filtered signals. At step 210, the center frequency of each adaptive filter in the matrix of bandpass filters is adjusted based on a phase relationship between the digital audio signal and a corresponding one of the plurality of bandpass filtered signals. The adjustment based on the phase relationship is similar to that illustrated in steps 108 and 110 of FIG. 1.

The matrix of bandpass filters may be arranged in a variety of ways in order to detect the plurality of feedback components. For example, serial chains of filters may be used, where each chain detects a single feedback component. Each of the bandpass filters in the chain detects one of the plurality of feedback components. In this case, the signal passed by the passband of each bandpass filter in the chain is subtracted from the digital audio signal before feeding it to the subsequent bandpass filter in the chain. By subtracting the signal passed by their passbands, these filters attenuate the feedback components that they detect. Thus, assuming that the correct number of filters are provided in the chain, the final bandpass filter in the chain would receive a signal containing a single feedback component. At this point, the detection of the single feedback component would be similar to that described in FIG. 1.

After the plurality of feedback components are detected, a plurality of notch filters are configured at step 212 based on the feedback frequencies of the feedback components. At step 214, the digital audio signal is filtered by the plurality of notch filters. Each notch filter attenuates one of the feedback components, and the notch filters are arrayed in series such that the plurality of feedback components are attenuated in the digital audio signal to produce a filtered digital audio signal. At stop 216, the filtered digital audio signal is converted to a filtered analog audio signal for further use in the system.

Figure 3:
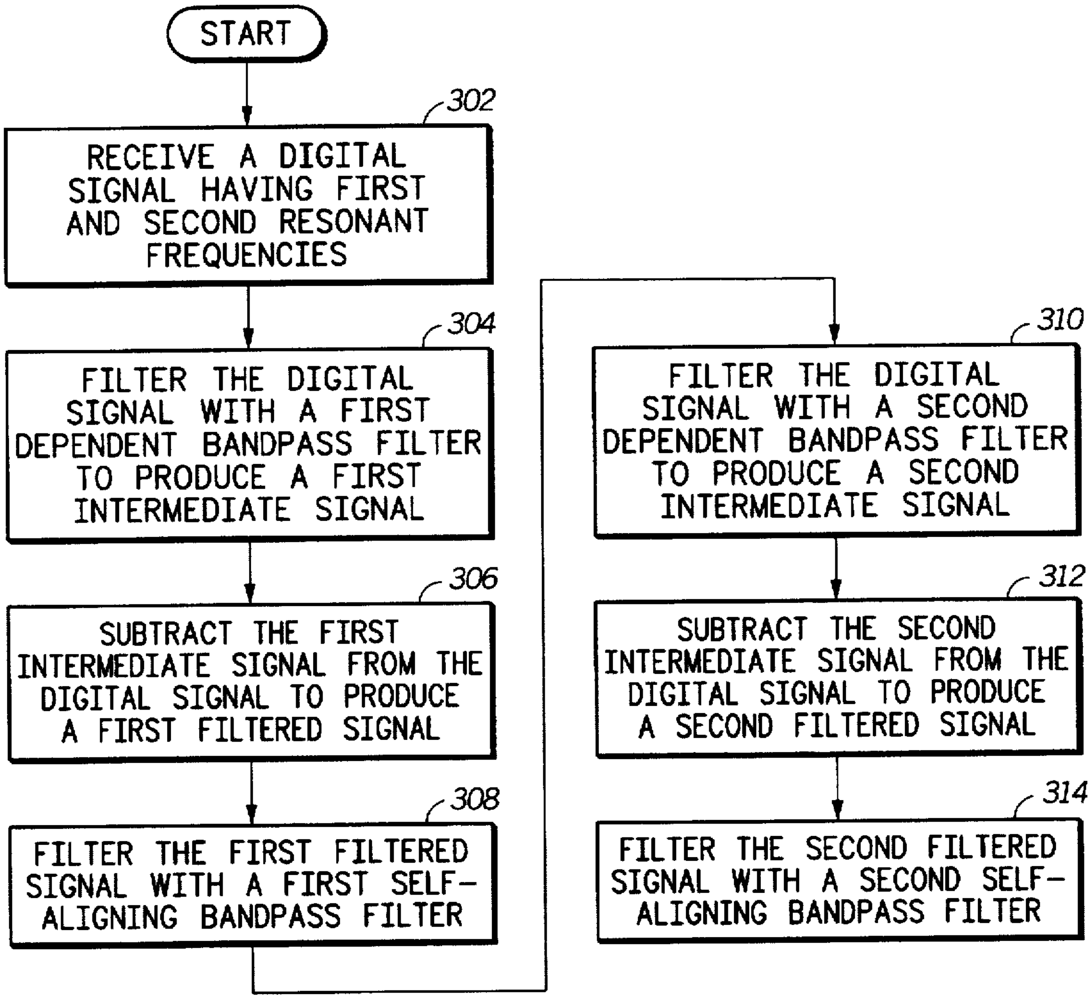
FIG. 3 illustrates, in a flow diagram, a method for detecting first and second resonant frequencies in a digital signal in accordance with the present invention.
Figure 4:
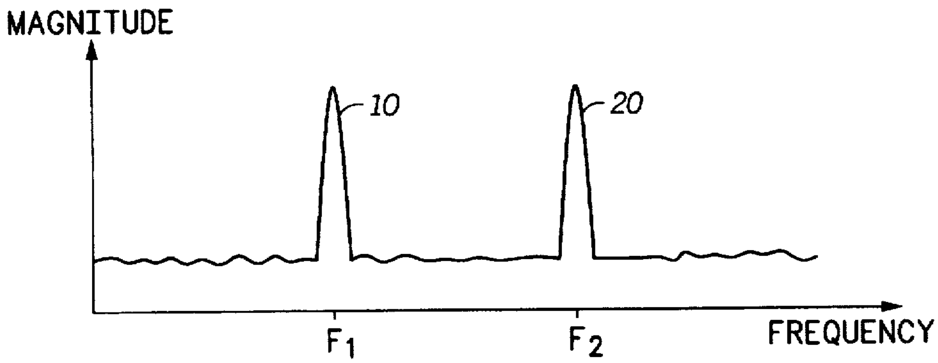
FIG. 4 illustrates a frequency spectrum of a digital audio signal containing two resonant frequencies.
Figure 5:
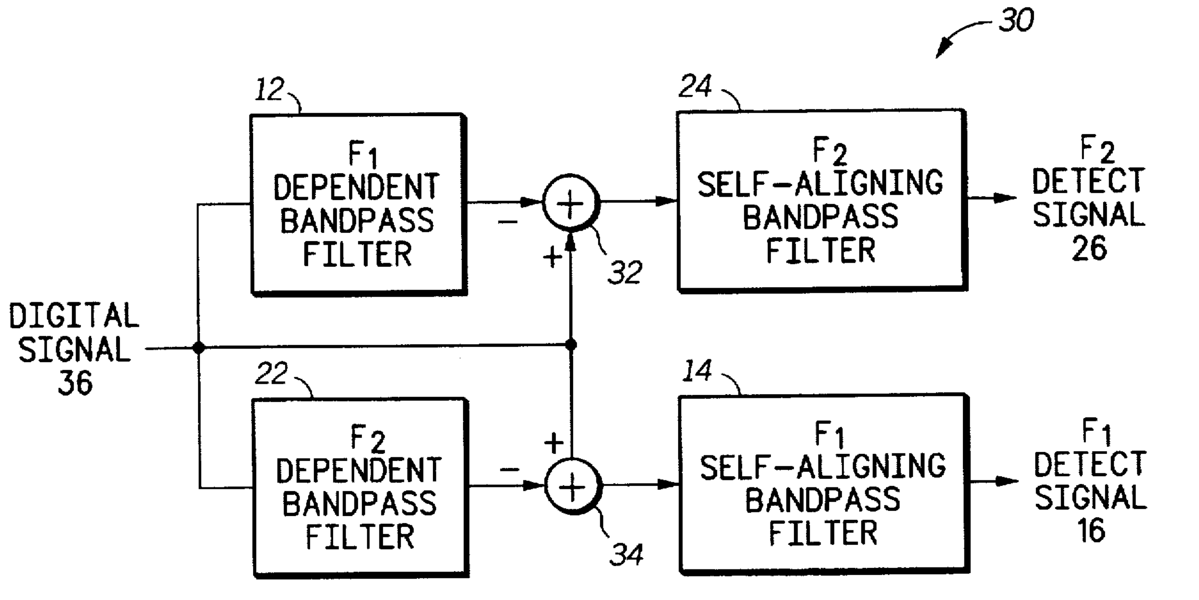
FIG. 5 illustrates, in a block diagram, an apparatus for detecting the resonant frequencies depicted in FIG. 4 in accordance with the present invention.

FIG. 3 illustrates a method for detecting first and second resonant frequencies in a digital signal. A resonant frequency may be produced by feedback in a system. The method of FIG. 3 is better understood by referencing related FIGS. 4 and 5. FIG. 4 illustrates a frequency spectrum of a digital audio signal containing two resonant frequencies, and FIG. 5 illustrates an apparatus that may be used to detect the resonant frequencies depicted in FIG. 4.

At step 302 of FIG. 3, a digital signal is received, where the digital signal includes first and second resonant frequencies. As is shown in FIG. 4, which may represent the frequency spectrum of the digital signal, the two resonant frequencies 10, 20 occur at frequencies $F_1$ and $F_2$. Resonant frequencies 10, 20 have much greater amplitude than that present in the non-feedback portion of the signal that is present in the remaining area of the frequency spectrum.

As illustrated in FIG. 4, at step 304, the digital signal is filtered with a first dependent bandpass filter to produce a first intermediate signal. The first dependent bandpass filter 12 (FIG. 5) passes a first dependent frequency based on a first frequency parameter, where the first resonant frequency is within the first dependent frequency band. Thus, referring the FIG. 4, the resonant frequency 10 is passed by the first dependent bandpass filter 12 to produce a first intermediate signal.

At step 306, the first intermediate signal is subtracted from the digital signal to produce a first filtered signal. Because the first intermediate signal includes the first resonant frequency 10 and this intermediate signal is subtracted from the digital signal, the first filtered signal will include second resonant frequency 20, but not the first resonant frequency 10. At step 308 the first filtered signal is further filtered with a first self-aligning bandpass filter 24 (FIG. 5) to detect the second resonant frequency. The first self-aligning bandpass filter 24 passes a first self-aligning frequency band based on a second frequency parameter that corresponds to the second resonant frequency. Thus, the first self-aligning bandpass filter 24 passes the second resonant frequency 20 based on the second frequency parameter, where the second frequency parameter is determined based on a phase relationship between the first filtered signal an output of the first self-aligning bandpass filter. Step 306 is similar to steps 108 and 110 of FIG. 1. The phase relationship between the input signal and the output signal of the serf-aligning bandpass filter causes the filter to shift such that it aligns itself with the resonant frequency, or feedback frequency, that it is trying to detect. When the phase relationship reaches a particular predetermined value, the resonant frequency is detected. In the preferred embodiment this predetermined value is reached when the phase difference between the input and the output signal is equal to zero.

At step 310, the digital signal is filtered with a second dependent bandpass filter 22 (FIG. 5) to produce a second intermediate signal. The second dependent bandpass filter 22 passes a second dependent frequency band based on the second frequency parameter which is determined in step 308 above. Thus the second dependent bandpass filter 22 passes the second resonant frequency 20 based on information from the first self-aligning bandpass filter 24 which is constantly adapting to align itself with the second resonant frequency 20. At step 312, the second resonant frequency 20, which is part of the second intermediate signal, is subtracted from the digital signal. This produces a second filtered signal that has the second resonant frequency 20 attenuated, while the first resonant frequency 10 remains.

At step 314, a second self-aligning bandpass filter 14 (FIG. 5) is used to filter the second filtered signal to detect the first resonant frequency in a manner similar to that described for step 308 above. The second self-aligning bandpass filter 14 aligns itself based on the first frequency parameter, which is also used in the first dependent bandpass filter 12 of step 304. Thus, the second self-aligning bandpass filter 14 aligns itself to the first resonant frequency 10, which is detected when the phase relationship between the input and output signals to the second self-aligning bandpass filter reaches the predetermined value.

The apparatus 30 illustrated in FIG. 5 can be used to aid in understanding the method just described. Digital signal 36 is received by the apparatus 30, where the digital signal 36 includes a first and a second resonant frequency. $F_1$ dependent bandpass filter 12, which is dependent on a parameter produced by $F_1$ self-aligning bandpass filter 14, passes the first resonant frequency. The first resonant frequency is subtracted from the digital signal 36 via the adder 32. The resulting signal is then presented to the $F_2$ self-aligning bandpass filter 24, which detects the second resonant frequency when the phase relationship between its input signal and its output signal ($F_2$ detect signal 26) reaches the predetermined value. Until the predetermined value is reached, the passband of the $F_2$ self-aligning bandpass filter 24 is adjusted based on the current state of the phase relationship, and it eventually converges at the location of the second resonant frequency.

One of the parameters that determines the current position of the $F_2$self-aligning bandpass filter 24 is used by the $F_2$ dependent bandpass filter 22 to isolate the second resonant frequency from the original digital signal 36. After being isolated, the second resonant frequency is subtracted from the digital signal 36 by the adder 34, and the result is passed to the $F_1$ self-aligning bandpass filter 14, which tracks and detects the first resonant frequency in the same manner the $F_2$ self-aligning bandpass filter 24 uses to detect the second resonant frequency. In the process, the $F_1$ self-aligning bandpass filter 14 produces a parameter based on the phase relationship between its input and its output ($F_1$ detect signal 16), and this parameter is used by the $F_1$ dependent bandpass filter 12.

Figure 6:
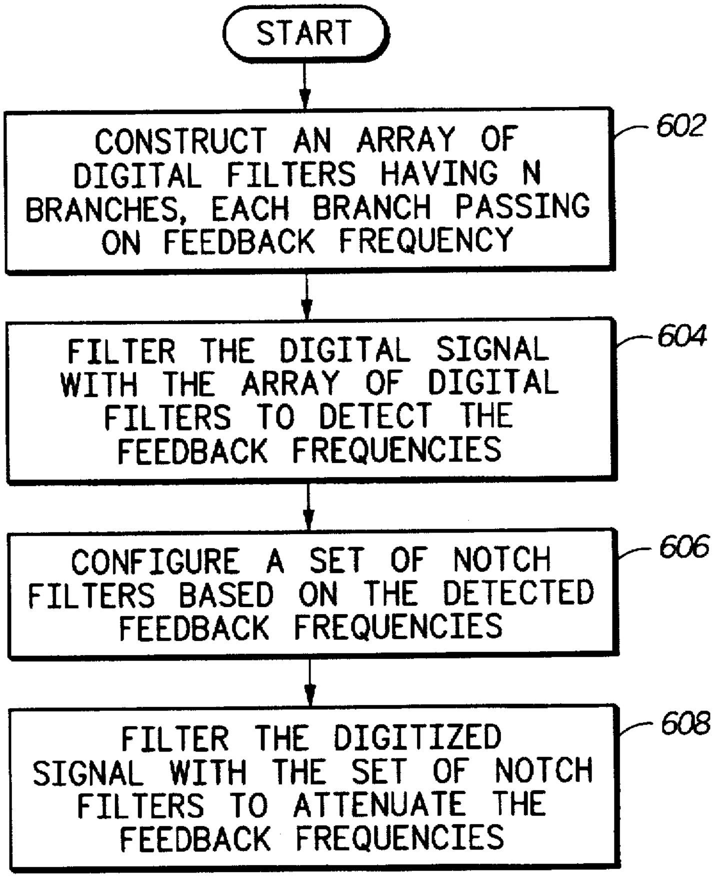
FIG. 6 illustrates a flow diagram of a method for detecting N feedback frequencies in a digitized signal in accordance with the present invention.

FIG. 6 illustrates a method for detecting and attenuating N feedback frequencies in a digitized signal. At step 602, an array of digital filters having N branches is constructed. The array is arranged in a tree structure, where each of the N branches of the tree includes N filters. Within each branch, N−1 of the N filters are notch filters, and each of the N−1 notch filters attenuates the digitized signal at one of the feedback frequencies. The remaining filter in each branch is a bandpass filter that passes the remaining feedback frequency. The tree structure may be such that branches share serial arrays of common filters, thus reducing the total number of filters required to implement the tree.

At step 604, the digitized signal is filtered by the array of digital filters (FIG. 8) such that each of the N branches of the array detects one of the N feedback frequencies to produce N detected feedback frequencies. The detection occurs when the phase relationship of the input and output of the final bandpass filter of each chain reaches a predetermined value, which is zero in the preferred embodiment. Preferably, all of the filters in the chains are IIR filters, and each of the notch filters is dependent on a variable used in one of the bandpass filters present at the end of one of the other chains.

At step 606, a set of N notch filters is configured based on the N detected feedback frequencies, where each of the notch filters corresponds to one of the feedback frequencies. At step 608, the digitized signal is filtered with the N notch filters to attenuate the feedback frequencies. The notch filters are aligned in series, or cascaded, in the path of the digitized signal to accomplish this. Thus it is possible to detect and eliminate multiple feedback frequencies simultaneously without the need for analog filters or time-to-frequency conversion.

Figure 7:
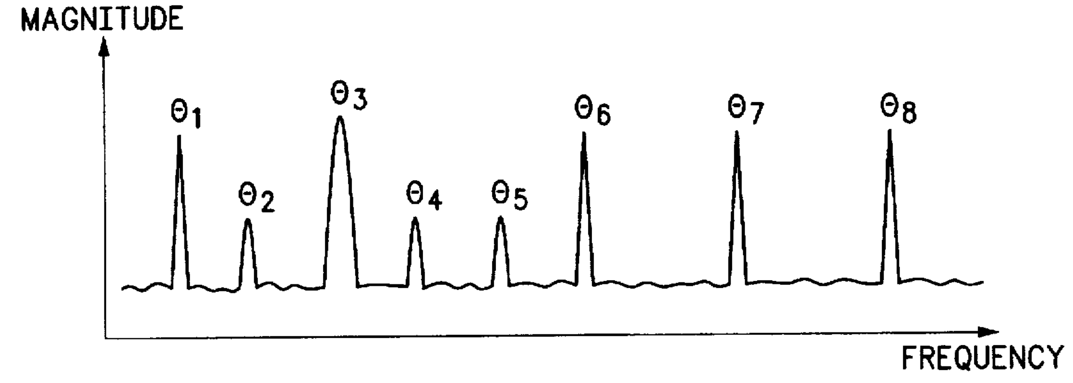
FIG. 7 illustrates a frequency spectrum of a digitized signal containing multiple feedback frequencies.
Figure 8:
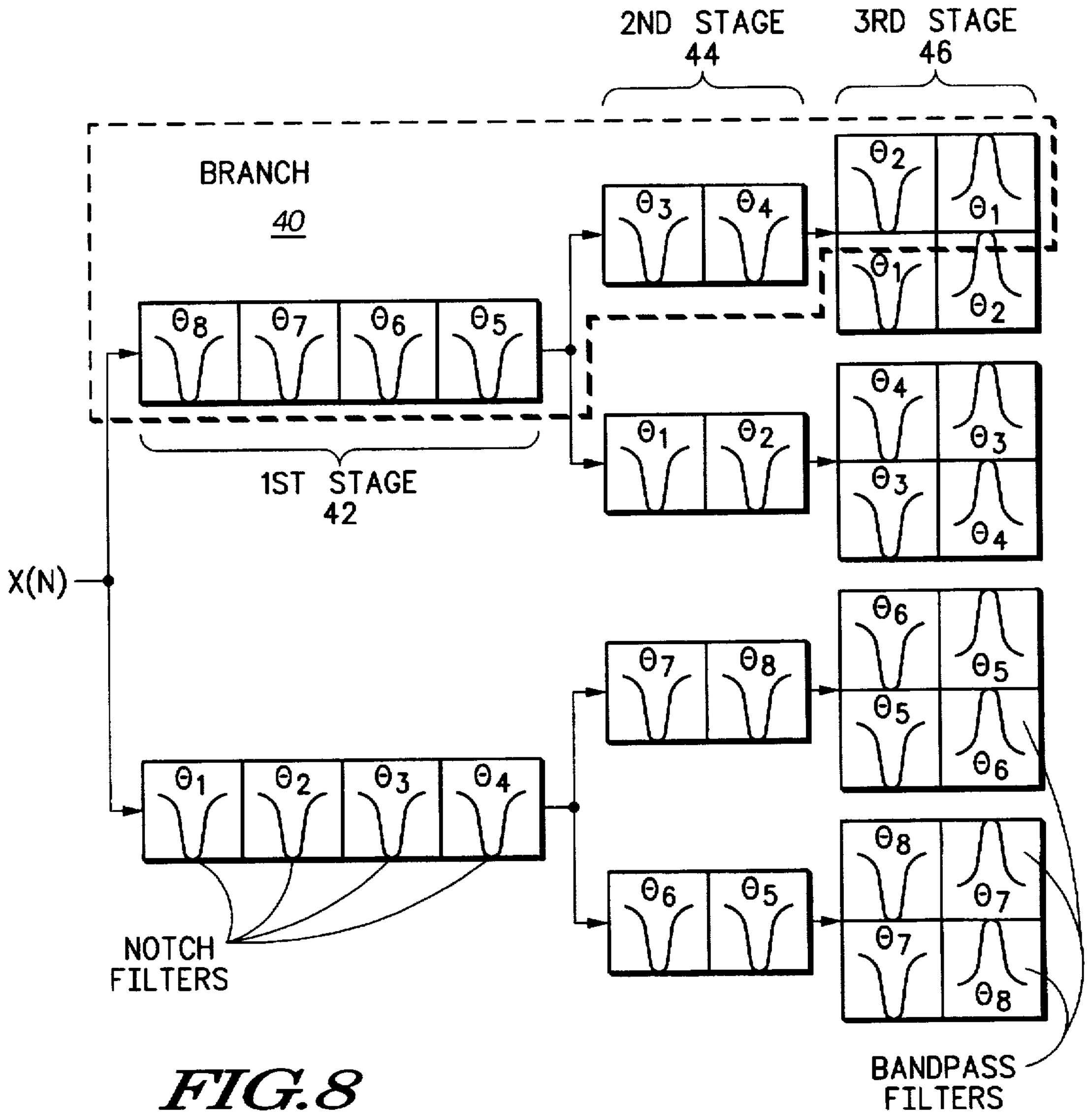
FIG. 8 illustrates an array of digital filters in accordance with the present invention.

The method of FIG. 6 may be better understood by referencing related FIGS. 7 and 8. FIG. 7 illustrates a frequency spectrum of a digital audio signal containing feedback frequencies $\theta_1$–$\theta_8$. FIG. 8 illustrates an army of filters that may be produced using step 602 of FIG. 6 that can be used to detect feedback frequencies $\theta_1$–$\theta_8$. The array includes a total of eight branches, one branch for each feedback frequency. The top branch 40 is configured to detect feedback frequency $\theta_1$. The first stage 42 of branch 40 includes four notch filters used to attenuate the feedback components at frequencies $\theta_8$, $\theta_7$, $\theta_6$, and $\theta_5$. The first stage 42 is shared by four of the branches, reducing the total number of filters that would be required if each branch included eight un-shared filters.

The second stage 44 of branch 40 includes two notch filters that attenuate feedback components at the frequencies $\theta_3$ and $\theta_4$. This second stage is shared by two branches in the tree structure, and further reduces the total number of notch filters required in the tree. At the third stage 46 of the branch 40, a notch filter is used to attenuate the feedback component at $\theta_2$ and a bandpass filter is used to pass the only remaining feedback component, which is at the frequency corresponding to $\theta_1$. The bandpass filter in third stage 46 compares the phase relationship of its input and its output to align its passband to the frequency corresponding to $\theta_1$. This phase relationship produces a parameter that may also be used by the notch filters in other branches of the tree that attenuate the feedback components at $\theta_1$.

If eight serial chains of filters are used without sharing common serial arrays, a total of 64 filters would be required. By sharing serial arrays of common filters, this number is reduced to 32. As can be seen, the reduction percentage is greatest when the number of chains is a power of two.

Figure 9:
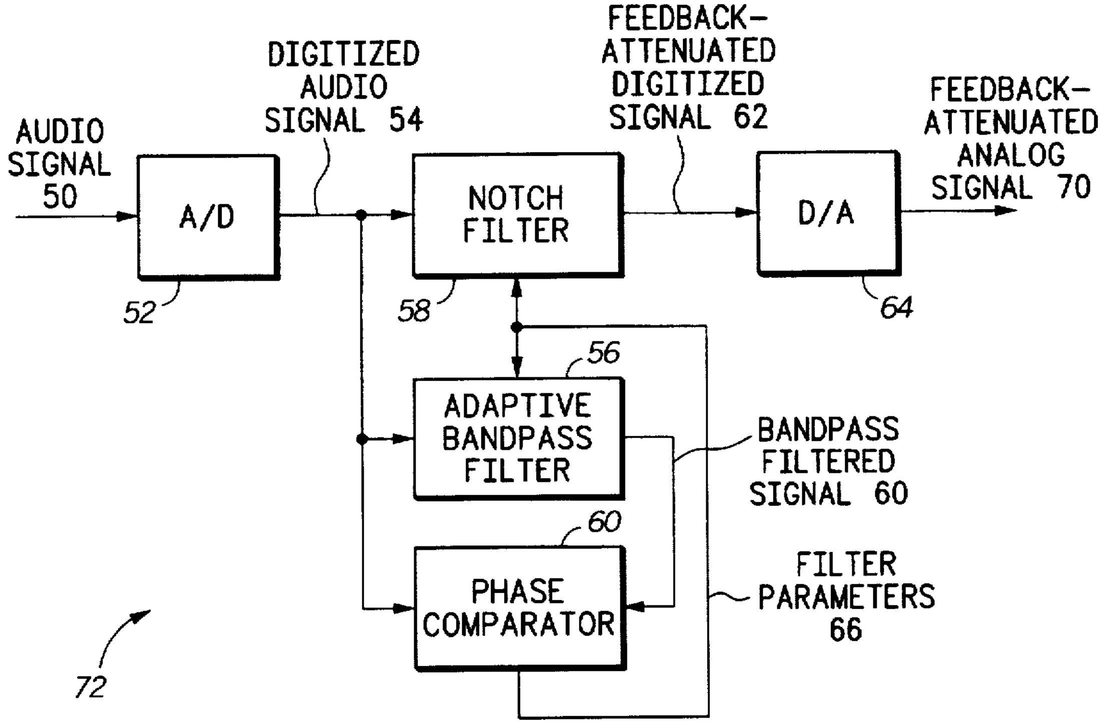
FIG. 9 illustrates, in a block diagram, an apparatus for removing acoustic feedback from an audio signal in accordance with the present invention.

FIG. 9 illustrates an apparatus 72 for removing acoustic feedback occurring at a feedback frequency from an audio signal. The apparatus 72 includes an analog-to-digital converter (A/D) 72, an adaptive bandpass filter 56, a phase comparator 60, a notch filter 58, and a digital-to-analog (D/A) converter 64. The A/D 52 receives the audio signal 50 and converts it to a digitized audio signal 54. Adaptive bandpass filter 56, which is an IIR filter in the preferred embodiment, filters the digitized audio signal 54 to produce a bandpass filtered signal 68. The adaptive bandpass filter 56 passes a frequency range based on filter parameters 66.

The phase comparator 60 produces the filter parameters 66 based on a phase relationship between the digitized audio signal 54 and the bandpass filtered signal 68. The filter parameters 66 are adjusted by the phase comparator 60 such that the frequency range of the bandpass filter 56 includes the feedback frequency. The notch filter 58, which is an IIR filter in the preferred embodiment, is configured based on a portion of the filter parameters 66 such that it attenuates the digitized audio signal 54 in the frequency range which includes the feedback. The notch filter 58 thus removes the feedback to produce feedback-attenuated digitized signal 62. The D/A 64 converts the feedback-attenuated digitized signal to analog format to produce feedback-attenuated analog signal 70.

Figure 10:
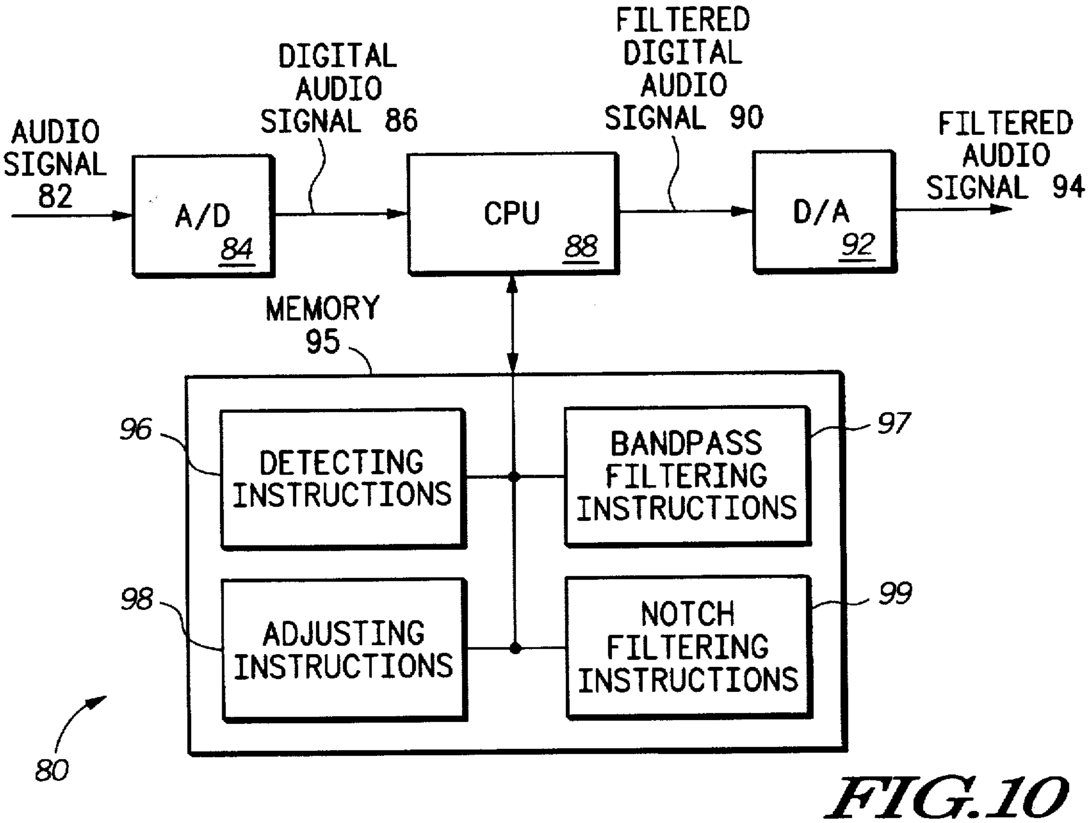
FIG. 10 illustrates, in a block diagram, another apparatus for removing acoustic feedback from an audio signal in accordance with the present invention.

FIG. 10 illustrates another apparatus 80 for removing acoustic feedback from an audio signal. Apparatus 80 includes A/D 84, central processing unit (CPU) 88, memory 95, and D/A 92. In the preferred embodiment, all of the circuitry of the apparatus 80 is included on a single DSP integrated circuit. The A/D 84 converts the audio signal 82 to digital audio signal 86. The CPU 88 receives the digital audio signal and executes sets of instructions 96–99 stored in the memory 95, where the instructions 96–99 cause the CPU 88 to filter the digital audio signal 86 to produce filtered digital audio signal 90.

The memory 95 includes instructions 88 for detecting a feedback component of the digital audio signal 86, instructions 97 for filtering the digital audio signal 86 with an adaptive bandpass filter, instructions 98 for adjusting a center frequency of the adaptive bandpass filter based on a phase relationship between the input and the output of the filter, and instructions 99 for filtering the digital audio signal 86 with a notch filter based on parameters used to adjust the bandpass filter. When executed by the CPU 88, the instructions 96–99 detect and attenuate a feedback component in the digital audio signal 86, producing filtered digital audio signal 90. These instructions may be repeated multiple times to detect and attenuate multiple feedback components. The D/A 92 converts the filtered digital audio signal 90 to analog format, resulting in the filtered audio signal 94.

The present invention provides a method and apparatus for removing acoustic feedback from an audio signal, where the acoustic feedback may change over time. By utilizing the method and apparatus described herein, Feedback can be detected and attenuated in a manner which eliminates the need for complex analog filters and the need to perform a time-to-frequency conversion of a digitized audio signal.

We claim:

1. A method for removing acoustic feedback from an audio signal, the method comprising the steps of:

receiving the audio signal;

digitizing the audio signal to produce a digital audio signal over time;

detecting a first feedback component of the digital audio signal by applying an adaptive bandpass filter to the digital audio signal over time, the first feedback component occurring at a first feedback frequency;

configuring a first notch filter based on the first feedback frequency;

filtering the digital audio signal using the first notch filter such that the first feedback component of the digital audio signal is attenuated to produce a filtered digital audio signal; and converting the filtered digital audio signal to a filtered analog audio signal wherein the step of detecting a first feedback component further comprises:

filtering the digital audio signal with the adaptive bandpass filter to produce a bandpass filtered signal; and adjusting a center frequency of the adaptive bandpass filter based on a phase relationship between the digital audio signal and the bandpass filtered signal.

2. The method of claim 1 further comprises:

detecting a second feedback component of the digital audio signal using the adaptive bandpass filter, the second feedback component occurring at a second feedback frequency;

configuring a second notch filter based on the second feedback frequency; and filtering the digital audio signal using the second notch filter such that the second feedback component of the digital audio signal is attenuated.

3. The method of claim 1, wherein the step of filtering the digital audio signal further comprises filtering the digital audio signal with a second-order Infinite Impulse Response filter.

4. A method for removing acoustic feedback from an audio signal, the method comprising the steps of:

receiving the audio signal;

digitizing the audio signal to produce a digital audio signal;

detecting a plurality of feedback components of the digital audio signal using a matrix of adaptive bandpass filters, the plurality of feedback components having a corresponding plurality of feedback frequencies, each of the plurality of feedback components having a corresponding feedback frequency of the plurality of feedback frequencies;

configuring a plurality of notch filters, wherein each of the plurality of notch filters is configured based on one of the plurality of feedback frequencies;

filtering the digital audio signal using the plurality of notch filters such that the plurality of feedback components are attenuated in the digital audio signal to produce a filtered digital audio signal; and converting the filtered digital audio signal to a filtered analog audio signal wherein the step of detecting further comprises:

filtering the digital audio signal with the matrix of adaptive bandpass filters to produce a plurality of bandpass filtered signals; and adjusting a center frequency of each adaptive bandpass filter of the matrix of adaptive bandpass filters based on a phase relationship between the digital audio signal and a corresponding one of the plurality of bandpass filtered signals.

5. The method of claim 4, wherein the step of filtering the digital audio signal further comprises filtering the digital audio signal with a matrix of second-order Infinite Impulse Response filters.

6. An apparatus for removing acoustic feedback occurring at a feedback frequency from an audio signal comprising:

an analog-to-digital converter that converts the audio signal to a digitized audio signal;

an adaptive bandpass filter, operably coupled to the analog-to-digital converter, for filtering the digitized audio signal to produce a bandpass filtered signal, and for passing a frequency range based on filter parameters;

a phase comparator, operably coupled to the analog-to-digital converter and the adaptive bandpass filter, for producing the filter parameters based on a phase relationship between the digitized audio signal and the bandpass filtered signal, the phase comparator adjusting the filter parameters such that the frequency range of the adaptive bandpass filter includes the feedback frequency of the acoustic feedback;

a notch filter operably coupled to the analog-to-digital converter and the phase comparator, the notch filter attenuating the digitized audio signal within a frequency range, the frequency range of the notch filter being based on a portion of the filter parameters such that the frequency range of the notch filter includes the feedback frequency, the notch filter attenuating the acoustic feedback to produce a feedback-attenuated digitized signal; and a digital-to-analog converter operably coupled to the notch filter, the digital-to-analog converter converting the feedback-attenuated digitized signal to a feedback-attenuated audio signal.

7. An apparatus for removing acoustic feedback occurring at a feedback frequency from an audio signal comprising:

an analog-to-digital converter that converts the audio signal to a digital audio signal;

a memory, the memory storing instructions for:

detecting a first feedback component of the digital audio signal using a first adaptive bandpass filter, the first feedback component occurring at a first feedback frequency;

filtering the digital audio signal with the first adaptive bandpass filter to produce a bandpass filtered signal;

adjusting a center frequency of the first adaptive bandpass filter based on a phase relationship between the digital audio signal and the bandpass filtered signal; and filtering the digital audio signal using a first notch filter such that the first feedback component of the digital audio signal is attenuated to produce a filtered digital audio signal;

a central processing unit operably coupled to the analog-to-digital converter and the memory, the central processing unit executing the instructions stored in the memory to produce the filtered digital audio signal; and a digital-to-analog converter, operably coupled to the central processing unit, for converting the filtered digital audio signal to a filtered audio signal.

8. A method for removing acoustic feedback from an audio signal, the method comprising the steps of:

receiving the audio signal;

digitizing the audio signal to produce a digital audio signal over time;

detecting a first feedback component of the digital audio signal by applying an infinite impulse response filter of at least second order to the digital audio signal over time, the first feedback component occurring at a first feedback frequency, the infinite impulse response filter using a phase relationship between the digital audio signal and an output of the infinite impulse response filter to remain centered on the first feedback frequency even if the first feedback frequency shifts over time;

configuring a first notch filter based on the first feedback frequency wherein the first notch filter centers on the first feedback frequency as the first feedback frequency shifts in frequency over time by obtaining frequency-shift information from the infinite impulse response filter;

filtering the digital audio signal using the first notch filter such that the first feedback component of the digital audio signal is attenuated to produce a filtered digital audio signal; and converting the filtered digital audio signal to a filtered analog audio signal.

9. The method of claim 8 further comprising:

detecting a second feedback component of the digital audio signal using the infinite impulse response filter, the second feedback component occurring at a second feedback frequency which is different from the first feedback frequency;

configuring a second notch filter based on the second feedback frequency; and filtering the digital audio signal using the second notch filter such that the second feedback component of the digital audio signal is attenuated.

10. The method of claim 9 further comprising:

configuring the second notch filter so that a frequency of operation of the second notch filter changes based upon phase relationship information received from the infinite impulse response filter.

11. A feedback attenuator for removing acoustic feedback occurring at a feedback frequency from an audio signal, the feedback attenuator being stored in computer memory and comprising:

input means for receiving a digital audio signal over time;

a first plurality of computer instructions stored in the computer memory for detecting a first feedback component of the digital audio signal using a first adaptive bandpass filter, the first feedback component occurring at a first feedback frequency;

a second plurality of computer instructions stored in the computer memory for filtering the digital audio signal with the first adaptive bandpass filter to produce a bandpass filtered signal;

a third plurality of computer instructions stored in the computer memory for adjusting a center frequency of the first adaptive bandpass filter based on a phase relationship between the digital audio signal and the bandpass filtered signal;

a fourth plurality of computer instructions stored in the computer memory for filtering the digital audio signal using a first notch filter such that the first feedback component of the digital audio signal as detected by the first adaptive bandpass filter is attenuated to produce a filtered digital audio signal; and output means for converting the filtered digital audio signal to a filtered audio output signal.

12. The feedback attenuator of claim 11 further comprising:

making the first adaptive bandpass filter a second order infinite impulse response filter.

* * * * *